United States Patent [19]
Farr

[11] 3,852,478
[45] Dec. 3, 1974

[54] MILK-CLOTTING ENZYME

[75] Inventor: David Robert Farr, La Tour-de-Peilz, Switzerland

[73] Assignee: Societe d'Assistance Technique pour Produits Nestle S.A., Lausanne, Switzerland

[22] Filed: Dec. 29, 1972

[21] Appl. No.: 319,772

[30] Foreign Application Priority Data
Jan. 20, 1972  Switzerland............................ 820/72

[52] U.S. Cl.................... 426/42, 195/62, 195/66 R, 426/36, 426/63
[51] Int. Cl.......................... C07g 7/02, A23c 19/02
[58] Field of Search............ 195/62, 66, 65; 99/116; 426/42, 36, 61, 63

[56] References Cited
OTHER PUBLICATIONS

Holter, et al., Distribution of Some Enzymes in the Cytoplasm of the Myxomycete Physarum Polycephalum, Chemical Abstracts, Vol. 47, 1953, (p. 7609g).
Chemical Abstracts, Enzymes, 8th collective Index, 1971, (p. 112805).
Kazuai, et al., Studies on Milk Clotting Enzymes Produced by Basidiomycetes, Agr. Biol. Chem., Vol. 34, No. 2, 1970, (pp. 159–163).
Knight, S. G., Production of a Rennin-Like Enzyme by Molds, Chemical Abstracts, Vol. 65, 1966, (p. 2679d).

*Primary Examiner*—David M. Naff
*Attorney, Agent, or Firm*—Watson, Leavenworth, Kelton & Taggart

[57] ABSTRACT

A milk-clotting enzyme having proteolytic activity similar to rennin and having the ability to cleave the phenylalanine-methionine bond of a kappa-casein polypeptide chain is produced by culturing a species of *Physarum polycephalum* in a culture medium until a substantial quantity of milk-clotting enzyme is accumulated extracellularly in the medium, and separating the enzyme from the culture medium.

8 Claims, No Drawings

MILK-CLOTTING ENZYME

This invention is concerned with the production by biosynthesis of milk-clotting enzymes suitable as replacements for rennet.

Rennet, a natural product having a coagulating effect on the casein in milk, is an extract obtained from the gastric membranes of milk calves. This coagulating effect is produced by an enzyme, called rennin, present in the extract which has a specific proteolytic activity towards kappa-casein.

In view of the particular nature of its source, rennet may only be produced at irregular times, according to the seasons, and in limited quantities. As this product is used in substantial quantities, especially in the cheese industry, efforts have been made to find suitable replacements. Numerous investigations, carried out in particular in the field of biosynthesis of milk-clotting proteolytic enzymes, have led to the preparation of such enzymes, frequently designated as "microbial rennets."

These microbial rennets, having proteolytic activities markedly different from natural rennet, do not always provide curds of satisfactory quality, especially in cheese making.

The present invention is concerned essentially with the preparation of an enzyme having proteolytic activity similar to rennin, especially towards kappa-casein, and which by coagulation of milk provides a curd of good quality. The present invention thus provides a process for producing a milk-clotting enzyme by biosynthesis, in which a microorganism of the species *Physarum polycephalum* producing this enzyme is cultured under aerobic conditions in an aqueous nutrient medium therefor until a substantial quantity of the enzyme is accumulated, and the enzyme is then separated from the microorganism.

*Physarum polycephalum* is a known microorganism belonging to the order of the Physarales in the Myxomycetes class. One strain of this microorganism, on deposit at the Centraalbureau voor Schimmelcultures, Baarn, The Netherlands, under the number 491.61, is available to the public.

During one phase of its life, the growth phase, this organism exists in a form characteristic of the Myxomycetes, called plasmodium. This plasmodium is an irregular mass of protoplasm containing many nuclei, not subdivided into cells, of yellow colour and which may have an area of several square centimeters. If the plasmodium is in an environment favourable for growth of the microorganism, the plasmodium remains static, whereas if the environment becomes unfavourable, or deficient in nutritive substances, the plasmodium migrates. If on migration the plasmodium does not find satisfactory conditions, the microorganism takes on a new form known as sclerotium in which it is capable of resisting cold and dessication and may survive for a year or more.

Growth of the plasmodium of *Physarum polycephalum* may be conducted under aerobic conditions, at a temperature of 20° to 25°C, in an aqueous nutrient medium of which the pH is adjusted to 4.5 – 4.6. The term "aqueous nutrient medium" designates an aqueous culture medium containing the substances necessary for the life of and assimilable by the microorganism. These substances include in particular sources of carbon and nitrogen and mineral salts. The nutrient medium may however also contain other substances such as vitamins, growth factors and trace elements. The aqueous nutrient medium may thus contain carbohydrates such as glucose, protein hydrolysates, yeast extracts, chicken embryo extracts, mineral salts. Protein hydrolysates, yeast extracts and chicken embryo extracts may be replaced, respectively, by a mixture of amino acids, biotin and haematin.

Growth of *Physarum polycephalum* may be conducted both as a surface culture on a solid substrate, and in submerged culture, for example in shaked flasks or in a fermenter.

Thus, for example, if the plasmodium of *Physarum polycephalum* is grown by surface culture, a suitable culture medium may be prepared by adding agar to a sterilised nutrient medium containing glucose, yeast extract, protein hydrolysate, mineral salts and haematin, the last constituent being added after sterilisation of the aqueous medium. The mixture is poured into Petri dishes, inoculated with a plasmodium of *Physarum polycephalum* and maintained at incubation temperature, for example at 25°C. The culture develops rapidly, covering the surface of the Petri dish in a few days, and remains in plasmodium form for another week before the appearance of sclerotium.

Surface culture may also be effected on a filter paper supplied with liquid nutrient medium by capillary attraction.

When the microorganism is grown in submerged culture, for example in shaked flasks or in a fermenter, *Physarum polycephalum* exists in the form of plasmodium subdivided into very small particles, called microplasmodia, which are in suspension in the liquid nutrient medium.

If culture is carried out in flasks, sterilised nutrient medium is poured into the flasks and inoculated with a plasmodium produced by surface or submerged culture. Culture is continued at an appropriate temperature, for example 25°C, with shaking of the flasks to ensure proper oxygenation of the microorganism. After a lag phase, which may last 12 hours if the inoculum comes from a submerged culture, or 2 to 3 days if the inoculum was obtained by surface culture on agar, growth reaches a maximum after 3 days.

If submerged culture is carried out in a fermenter, the liquid nutrient medium is supplied to the fermenter and then sterilised. Preferred sources of assimilable carbon and nitrogen are respectively glucose and yeast extract and protein hydrolysates, and the glucose, in conventional manner, is generally added to the nutrient medium after sterilisation of the other constituents in the fermenter. The inoculum, obtained preferably by submerged culture, is injected into the fermenter maintained at a temperature appropriate for growth of the microorganism, for example 25°C. Culture is carried out with stirring with a rotating stirrer turning at a sufficient speed to assure proper oxygenation of the medium.

Analysis of the culture medium has shown that, irrespective of the culture method, *Physarum polycephalum* extracellularly produces a milk-clotting enzyme. This enzyme, which may then be recovered in aqueous solution, may with advantage be used as a replacement for rennet for the coagulation of milk.

If the microorganism is grown by surface culture, the enzyme may be recovered by washing the microorganism with a saline solution, for example an aqueous sodium chloride solution containing 9.0 g of NaCl/litre of water, and collecting the washings containing the enzyme in solution.

If the *Physarum polycephalum* is cultured under submerged conditions, in flasks or in a fermenter, the microplasmodia may be separated from the liquid nutrient medium, for example by decanting, filtering or centrifugation, and collecting the aqueous residual liquid containing the enzyme in solution.

The aqueous solution obtained by both methods has an easily-determinable enzyme activity.

On the other hand the coagulating effect on milk of this aqueous solution has been demonstrated on skimmed milks of various solid matter contents, in particular 12 percent and 24 percent.

In a particularly preferred embodiment of the process according to the invention, a concentrated solution of the enzyme is prepared by freeze-concentration of the aqueous solution obtained by either of the methods described previously. This may conveniently be effected by subjecting the solution to slow freezing, separating the frozen phase from the liquid phase and recovering the residual liquid phase which has a higher protein content that the frozen phase. This liquid phase is preferably collected by mixing with a buffer solution the pH of which is favourable for the proteolytic activity of the enzyme.

It is also possible, when a pure product is desired, to separate the proteolytic enzyme from the other substances present in the concentrated enzyme solution. For this purpose the protein may be separated from the concentrated solution, for example by precipitation, and redissolved to provide a second aqueous solution which may be fractionated by a chromatographic technique. Eluted fractions having the desired optical density and proteolytic activity are then isolated to obtain a practically pure product.

Examination of the enzyme thus purified has shown that it cleaves specifically the phenylalanine-methionine bond of the kappa-casein peptide chain, which means that it has a coagulating action on milk which may be considered as identical with that of rennin.

The invention is illustrated by the following examples, in which the percentages are expressed on a weight basis.

EXAMPLE 1

Culture of a strain of *Physarum polycephalum*, obtained from the Swiss Institute for Cancer Research (Lausanne, Switzerland), is effected under submerged conditions in a 15 litre fermenter containing an aqueous nutrient medium having the following composition:

| | |
|---|---|
| Glucose | 1.0 % |
| Yeast extract | 0.15 |
| Casein hydrolysate (tryptone) | 1.0 |
| $CaCl_2,2H_2O$ | 0.06 |
| $KH_2PO_4$ | 0.2 |
| $MgSO_4,7H_2O$ | 0.06 |
| $FeCl_2,4H_2O$ | 0.006 |
| $MnCl_2,4H_2O$ | 0.0085 |
| $ZnSO_4,7H_2O$ | 0.0035 |
| Citric acid | 0.35 |
| Haematin | 0.0005 |
| Tap water | balance to 100 % |

8 litres of an aqueous solution containing these constituents, with the exception of glucose, are supplied to the fermenter and sterilised by heating under pressure for 15 minutes at 121°C. The glucose is dissolved in water, at a level of 50 g/litre, and sterilised separately. The solution in the fermenter is then cooled to 25°C and the sterile aqueous glucose solution is added. The pH of the mixture is adjusted to 4.5 with a sterile sodium hydroxide solution and the haematin, previously sterilised for 15 minutes in alkaline solution at 121°C, is added.

2 litres of inoculum, obtained by shaked flask culture for two days of *Physarum polycephalum* microplasmodia, are then added to the nutrient medium.

The nutrient medium is agitated with a stirrer rotating at 150 r.p.m., to assure sufficient oxygenation of the medium, and is maintained at 25°C. Culture of the microorganism is continued for 20 hours under these conditions and a culture medium containing 1 percent cell dry matter is obtained.

The microplasmodia of *Physarum polycephalum* are then separated from the aqueous nutrient medium by centrifugation and the supernatant is collected. The proteolytic activity of the supernatant is then determined by the "Azocoll" method. This method involves reacting the solution of which the proteolytic activity is being determined with a substrate called "Azocoll," which is an insoluble powder, obtained from cowhide, containing a brilliant red pigment. This substance contains a very large number of the peptide bonds characteristic of proteins. When a proteolytic enzyme reacts with this substance, the red pigment is liberated in the medium and the colour intensity of the medium serves as a measure of the proteolytic activity of the enzyme under test. The "Azocoll" substrate is suspended in an 0.05 M acetate buffer solution, at pH 4.5, at a level of 25 mg of "Azocoll" per 5 ml of buffer. The supernatant is added to a predetermined quantity of this suspension, the mixture is maintained at 37°C for 15 minutes and the substrate is eliminated by filtration. The optical density of the resulting solution is then determined, at a wavelength of 510 nm. A unit of activity determined by this method is defined as the quantity of enzyme product, that is supernatant, which increases the optical density by one unit. The proteolytic activity of the supernatant, determined in this manner, is 0.7 units per ml.

The resulting product having enzyme activity has the following properties:

Influence of pH on proteolytic activity
Examination of the proteolytic activity in a pH range from 3.0 to 7.0 has shown that the activity is at a maximum between pH 4.0 and pH 5.0 and decreases to 15 percent of the maximum at pH 7.0.

Influence of temperature on activity
The proteolytic activity is unchanged between 0° and 30°C and decreases above 30°C to practically zero at 60°C.

Coagulating effect on milk
Mixing of equal volumes, at 37°C, of the supernatant and skimmed milk containing 12 percent solids leads to coagulation in 10 minutes.
Mixing under identical conditions with skimmed milk containing 24 percent solids induces coagulation in 4 minutes.

EXAMPLE 2

The supernatant obtained in Example 1 is freeze-concentrated, by cooling to induce formation of ice crystals. The unfrozen fraction, of which the concentration of proteinaceous substances has increased at the expense of the solid phase, is collected and mixed with an 0.05 M acetate buffer solution, at pH 4.5. 1.5 litres of a concentrated solution are thus obtained, the proteolytic activity of which, determined by the "Azocoll" method described in Example 1, is 3.5 units per ml.

The proteins present in the concentrated solution are then precipitated with ammonium sulphate and the precipitate formed is recovered by centrifugation. The precipitate is then dissolved in an 0.05 M acetate buffer solution at pH 4.5 and this solution is dialysed for 24 hours against the same buffer solution.

The resulting solution is then fractionated chromatographically by passage through a column of diethylaminoethyl cellulose equilibrated with an 0.05 M acetate buffer solution containing sodium chloride at decinormal concentration. Elution is carried out with this buffer solution, at a rate of 50 ml/hr. The optical density of each fraction eluted is measured at a wavelength of 260 nm, and the proteolytic activity of each is also measured. Elution of the enzyme appears as 3 very marked peaks of proteolytic activity, and the fractions corresponding to these 3 elution peaks are collected.

The activities on kappa-casein of rennin and of each of the eluted fractions are then compared.

Rennin specifically cleaves the phenylalanine-methionine bond of the kappa-casein peptide chain, and if it is reacted with kappa-casein and carboxypeptidase A is added, phenylalanine is liberated and may be estimated. It should be added that addition of carboxypeptidase A by itself does not liberate phenylalanine.

It has been found that the reaction with kappa-casein of the eluted fractions corresponding to the 3 peaks of proteolytic activity, in amounts of 1 part by weight of enzyme product per 100 parts by weight of substrate, followed by the action of carboxypeptidase A, leads to the liberation of phenylalanine. This demonstrates that rennin and the enzyme product react with kappa-casein in similar manner.

I claim:

1. A process for the production by biosynthesis of a milk-clotting agent comprising culturing the microorganism *Physarum polycephalum* under aerobic conditions in an aqueous nutrient medium therefor until a substantial quantity of milk-clotting enzyme having the ability to cleave the phenylalanine-methionine bond of a kappa-casein polypeptide chain is accumulated extracellularly in said medium, and separating said agent comprising said enzyme from said microorganism.

2. A process according to claim 1, in which the microorganism is cultured by surface culture and the agent is separated from said microorganism by washing.

3. A process according to claim 2, in which the agent is separated from the microorganism by washing with a saline solution.

4. A process according to claim 1 in which the microorganism is cultured under submerged conditions, in a liquid nutrient medium, and said microorganism is separated from said liquid nutrient medium containing enzyme.

5. A process according to claim 1, in which the agent is recovered in aqueous solution and said solution is concentrated by freeze-concentration.

6. A process according to claim 4, in which the agent is recovered in aqueous solution and said solution is concentrated by freeze-concentration.

7. A process according to claim 1 in which the microorganism is strain No. 491.61 of *Physarum polycephalum*.

8. A process for treating milk which comprises clotting milk with an agent prepared by the process of claim 1.

* * * * *